US005146601A

United States Patent [19]

Hosaka et al.

[11] Patent Number: 5,146,601

[45] Date of Patent: Sep. 8, 1992

[54] PULSE WIDTH MODULATION INPUT/OUTPUT CONTROLLER FOR IMAGE PROCESSING APPARATUS

[75] Inventors: Masao Hosaka, Sagamihara; Kazutoshi Shimada, Kawasaki; Tsuneki Inuzuka, Yokohama, all of Japan

[73] Assignee: Canon Kabushiki Kaisha, Tokyo, Japan

[21] Appl. No.: 522,081

[22] Filed: May 11, 1990

Related U.S. Application Data

[63] Continuation of Ser. No. 60,074, Jun. 9, 1987, abandoned.

[30] Foreign Application Priority Data

Jun. 13, 1986 [JP] Japan ................................ 61-136229

[51] Int. Cl.[5] ................................................ G06F 9/00

[52] U.S. Cl. .................................... 395/800; 355/208; 395/93; 395/118; 364/946.6; 364/465.5; 364/DIG. 2

[58] Field of Search ... 364/200 MS File, 900 MS File, 364/413.23; 355/208; 363/41; 395/93, 118, 800, 208

[56] References Cited

U.S. PATENT DOCUMENTS 4,058,772 11/1977 Mogi et al. .......................... 325/464
4,290,108 9/1981 Woehrle et al. ...................... 363/41
4,348,734 9/1982 Dougherty ........................... 363/41
4,466,052 8/1984 Thrap ................................... 363/41
4,466,070 8/1984 Claussen .............................. 363/41
4,568,173 2/1986 Abuyama ............................. 355/14
4,602,243 7/1986 Von Bargen et al. ...... 340/347 AD
4,661,918 4/1987 Buschman et al. ................. 364/569
4,661,919 4/1987 Buschman et al. ................. 364/569
4,665,498 5/1987 Buschman et al. ................. 364/569
4,669,050 5/1987 Buschman et al. ................. 364/569
4,733,304 3/1988 Homma et al. ...................... 358/280
4,819,188 4/1989 Matsubara et al. ............ 364/413.23
4,857,960 8/1989 Hosaka et al. ...................... 355/208

OTHER PUBLICATIONS

3

*Primary Examiner*—Thomas C. Lee
*Assistant Examiner*—Mehmet Geckil
*Attorney, Agent, or Firm*—Fitzpatrick, Cella, Harper & Scinto

[57] ABSTRACT

An image processing controller comprising a pulse control signal generator for controlling a load. A memory is provided for storing parameters, such as the period and duty factor of the pulse control signal. The parameters are transferred from the memory to the pulse control signal generator. The pulse control signal generator generates a pulse control signal having a predetermined pulse width at a predetermined period, in accordance with the parameters.

15 Claims, 11 Drawing Sheets

PULSE WIDTH MODULATION INPUT/OUTPUT CONTROLLER FOR IMAGE PROCESSING APPARATUS

This application is a continuation of application Ser. No. 07/060,074 filed Jun. 9, 1987, now abandoned.

BACKGROUND OF THE INVENTION

1. Field of the Invention

The present invention relates to a controller for an image processing apparatus which controls input/output devices by a pulse control signal such as pulse width modulation (PWM).

2. Related Background Art

Recent developments in the industries of office automation (OA) and factory automation (FA) has been remarkable. It may be a result of fine combination of electronics and mechanics. Needless to say, a base thereof greatly depends on mutual effect of the development of semiconductor integration technology and computer technology. A population of large amount of goods produced in an inexpensive manner largely depends on LSI implementation of the system.

Many of existing controllers use microcomputers or microcontrollers (one-chip microcomputer including a memory and I/O). However, many discrete parts are required to combine the machine and the controller, it may be superfluous. This is due to continuous change of an analog quantity in mechanical technology or in the natural field, especially. As an approach to solve the above problem, a one-chip microcomputer which has on-chip A/D converter or PWM output has been proposed. However, it is still insufficient to grasp a change of analog quantity in the natural field and feed an analog signal back to suppress the change, and in actual many separate controllers are externally provided. This increases a cost, which is due to a large number of types of analog signals to be fed back and lack of systematic control.

SUMMARY OF THE INVENTION

It is an object of the present invention to eliminate the drawbacks as above-mentioned.

It is another object of the present invention to provide an improved controller for an image processing apparatus.

It is another object of the present invention to provide a controller for an image processing apparatus which controls input/output devices to be controlled with high precision, systematically and with expandability.

It is another object of the present invention to provide a controller for an image processing apparatus which controls analog equipment in accordance with a preset parameter.

It is another object of the present invention to provide a controller for an image processing apparatus in which pulse-controls input/output devices in accordance with preset parameters for period, duty factor and frequency division ratio.

Other objects of the present invention will be apparent from the following embodiments.

DETAILED DESCRIPTION OF THE PREFERRED EMBODIMENTS

In an embodiment of the present invention, a power supply of a electromechanical controller is controlled without using special power supply discrete parts The power supply to power equipment, such as motors are controlled by the controller (electronic controller) for the electromechanical controller. In the prior art, utilization efficiency was very low because at least two timer/counters were used. In the present invention, variable PWM is generated to control the power supply. The entire electromechanical control is effected with high efficiency by using the microcontroller shown in FIGS. 2 and 3. The voltages and motors are controlled by the variable PWM with high precision over a wide control range.

Hierarchy of controller

Figure 2:
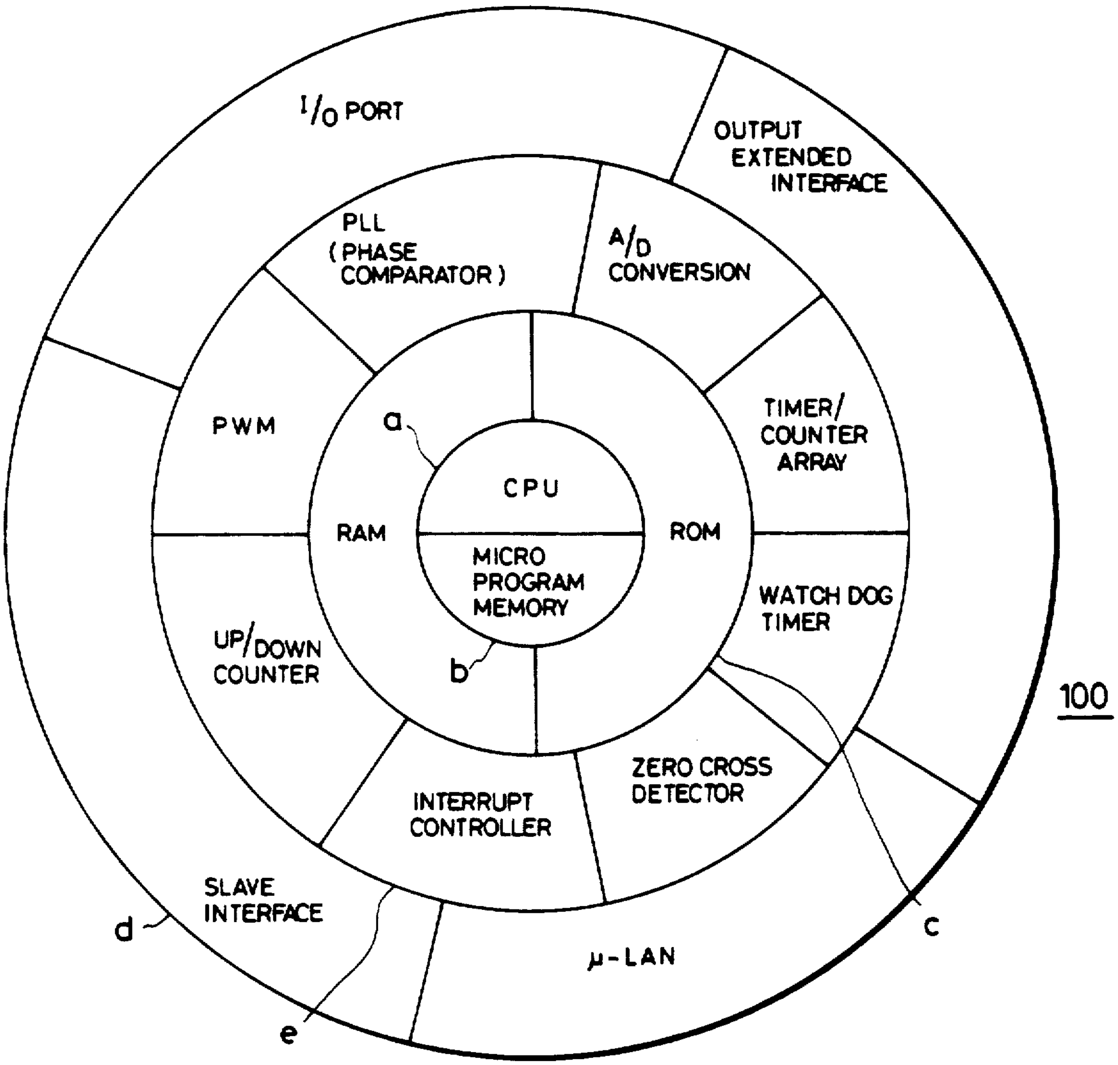
FIG. 2 shows a hierarchy chart of a controller of the embodiment.
Figure 3:
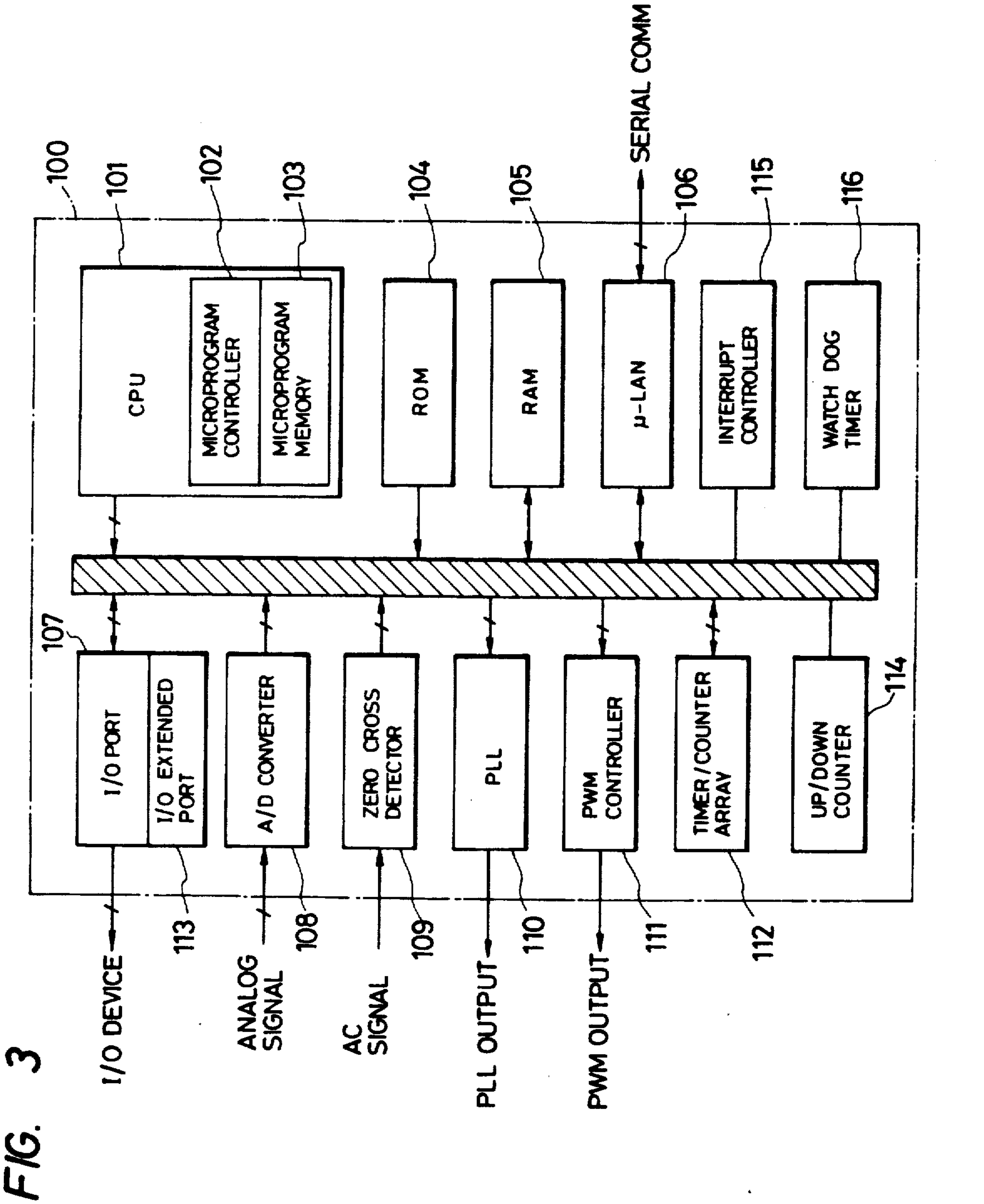
FIG. 3 shows a circuit diagram of an LSI of the controller of the embodiment.

Referring to FIGS. 2 and 3, the architecture of a controller 100 is explained. FIG. 2 shows a control hierarchy of the controller and FIG. 3 shows circuit connection. In FIG. 2, a layer a is a CPU 101 which is a conventional CPU except that it is high speed and low power consumption. It preferably uses a high performance CMOS (HCMOS) and is operable from 16 to 30 MHz. A layer b includes a microprogram memory 103 which is available to a user. A microprogram controller 102 executes a program stored in the microprogram memory 103. The user may program a microprogram to construct a macro instruction by which several blocks of instructions can be executed by one macro instruction. In this manner, analog processing which is a bottle neck of a digital computer is facilitated.

A layer c is a memory used by the user. It has a capacity necessary for control in a ROM 104 and a RAM 105.

A layer d which includes a slave interface, which is an interface layer to the external of the controller 100. It includes four interfaces. One of them is an interface to a slave controller to enable multi-processing. It has a bus buffer to facilitate communication with a host processor. It also has a plurality of buffers to allow connection of a higher speed host processor. An I/0 port 107 is a conventional I/O port. An I/O expansion interface 113 is on a chip of the microcontroller. When the I/O port 107 is insufficient, I/O elements are externally connected through the I/O expansion interface 113. It is an I/O expansion interface bus line which enables one-instruction access as if it were its own on-chip port. A μ-LAN 106 defines a serial I/O expansion and has a predetermined protocol. By using the μ-LAN 106 for the communication with the external, a multiprocessor can be constructed with two lines, or one line is case of a daisy chain system.

A layer e is for intelligent input/outputs each being independently operable under control of the CPU. The CPU merely supervises the intelligent input/outputs and it can attend to other tasks. Instructions from the CPU to the intelligent input/outputs are done by macro instruction. This allows PWM implementation of continuous sense of change of analog quantity and feedback thereof.

The controller 100 is designed to include all intelligent input/outputs necessary for the electromechanical controller and requires no special off-chip parts (for example, A/D converter, comparator or PWM LSI). The intelligent input/outputs have control functions by themselves and are operable independently from the CPU, as seen from the internal construction shown in FIG. 1. The layer e is an aggregation of them and the controller 100 is characterized by the intelligent inputs/outputs.

Intelligent Input/Outputs

An A/D converter 108 has a plurality of channels so that conversion speed is variable depending on an application. After the A/D conversion, data is set in a predetermined register, and the CPU 101 fetches the data specified by the macro instruction. In a certain case, an internal interruption occurs to inform the CPU 101. In an embodiment to be described later, the A/D converter 108 has a function to monitor an output voltage.

A watch dog timer 116 is a diagnostic timer to watch the operation of the CPU 101. When the CPU 101 malfunctions or stops, it indicates an error processing program or, in an emergent case, cuts off the power supply. A timer/counter array 112 has eight channels which are operable in parallel. The CPU 101 initially sets modes such as event counter, one-shot generation, square wave generation and repetitive pulse generation.

A zero crossing detector 109 detects a change in an A.C. signal (for example, 100 volts A.C.) to generate a reference phase signal. In a power conversion by a switching operation, the reference phase signal is used as a synchronization signal.

The outline of the controller 100 has been described. The PWM controller 111 which is a portion of the intelligence input/output and the most characteristic portion of the present embodiment is now explained.

PWM Controller

The PWM controller 111 has n channels, each having a function to vary a duty factor and a frequency. Thus, it may be used to drive a high precision switching regulator or pulse motor. A specific embodiment of the PWM controller will be described later. A basic configuration of the PWM controller is first explained.

The PWM control in the present embodiment is characterized by its variability. A response to a change of an external field is improved by the use of a microprogram in accordance with the construction of the controller shown in FIGS. 2 and 3 so that the process to the change in analog quantity to be controlled is improved.

Figure 1:
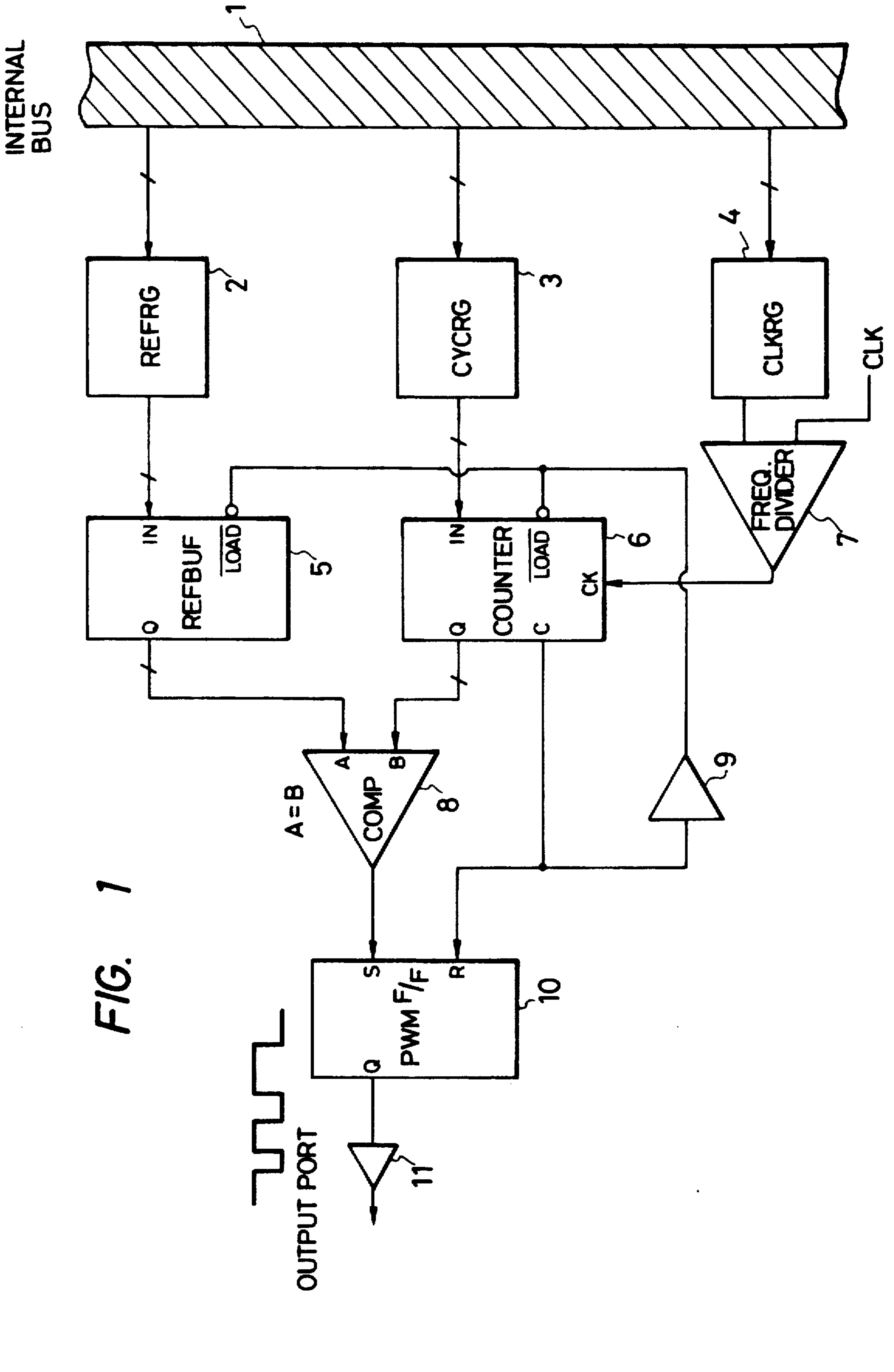
FIG. 1 shows a block diagram of a PWM control circuit in one embodiment of the present invention.

FIG. 1 shows an internal configuration of a variable PWM control signal generator. As is well known, when the PWM controller is applied to the power supply, the PWM controller utilizes phase control. In a narrow sense, it is a pulse width modulation (PWM) control to change a duty factor, and in a broad sense, it is an instantaneous value control to modulate a pulse width and a frequency. The PWM control in the present embodiment includes the later broad definition, that is, the instantaneous value control.

The PWM control is basically determined by a timing of the PWM control signal. The timing of the PWM control signal is determined by a register CYCRG 3 which determines a period, a register REFRG 2 which sets a "1" period (ON period) and a register CLKRG 4 which sets a frequency division ratio of a clock signal CLK. Register REBUF 5 is a parallel input buffer. When "0" is supplied to a $\overline{\text{LOAD}}$ terminal thereof, it stores the content of the register REFRG 2. Counter 6 is a down-counter which has a carry (C) output. When "0" is applied to a $\overline{\text{LOAD}}$ terminal thereof, it receives an initial value from the register CYCRG 3 and counts it down in accordance with the clock signal applied to a CK terminal. A comparator 8 compares outputs of the register REBUF and the counter 6. When the output of the comparator 8 is "1", a flip-flop 10 is set, when the counter 6 produces a carry, the flip-flop 10 is reset and the register REBUF and the counter 6 are initialized.

An overall operation of the PWM control signal generator is now explained. The period T of the PWM control signal is determined by setting a number into the register CYCRG and the "1" period (ON period) of the PWM control signal is determined by setting a number into the register REFRG. Further factor to determine the frequency is the register CLKRG which is a register to determine a frequency division ratio for the clock signal CLK of the basic period. The frequency divider 7 frequency-divides the CLK in accordance with the content of the CLKRG4. For example, when the oscillator of the controller is at 16MHz, it may be frequency-divided by a factor of ½, ¼, ⅛ or 1/16 to produce a signal of 8MHz, 4MHz, 2MHz or 1MHz.

The content of the register REFRG is supplied to the register REBUF. On the other hand, the value to determine the period is supplied to the counter 6, which counts down the input by the clock frequency-divided in accordance with the value of the register CLKRG. The content of the counter 6 and the content of the REFBUF5 are compared by the comparator 8, and when A=B, the PWM flip-flop 10 is set to produce "1". At this time, the counter 6 has the same content as that of the register REFRG. The count-down by the counter 6 further proceeds, and when the content changes from $(000)_H$, to $(1FF)_H$, (underflow), the carry output produces "1" and the PWM flip-flop 10 is reset to produce "0". The content of the register CYCRG is reloaded to the counter 6 and the content of the register REFRG is reloaded to the register REFRG. Thus, the OFF period ("0" period) is determined by the time period from the start of the count-down of the counter 6 to a time when the content of the counter 6 reaches the content of the register REFRG, and the ON time is determined by a time period from the start of the count-down of the counter 6 which has the same content as the register REFRG to a time when the carry output of the counter 6 produces "1". Thus, the register REFRG determines the ON period, and the register CYCRG determines the period T.

Since the content of the registers REFRG, CYCRG and CLKRG can be varied by the CPU 101 by the microinstruction through the internal bus 1, the pulse width modulation control can be instantaneously controlled. The present system which allows continuous change of period and frequency can provide finer control to the application to be described later than the PWM which merely changes the duty factor. If the controller changes the contents of the registers REFRG and CLKRG by the microinstruction during the PWM operation, the registers REFRG, CYCRG and CLKRG reload to the register REBUF, counter and frequency divider 7, respectively at the end of the current period. Accordingly, a waveform of the PWM is not disturbed during the operation. The output of the PWM flip-flop 10 is produced through the output port 11.

Figure 4:
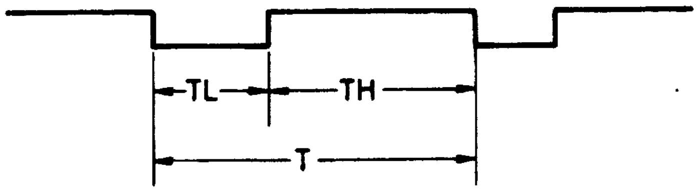
FIG. 4 shows a timing chart of a PWM control signal.

As shown in the time chart of FIG. 4, the period T of the PWM, "0" period $T_L$ and "1" period $T_H$ are given by $$T=(2\ CYCRG+1)\cdot CLK$$

$$T_H=REFRG\cdot CLK$$

$$T_L=(2\cdot CYCRG+1-REFRG)\cdot CLK$$

The period T is double because the number of bits of the register CYCRG is one bit larger than that of the register REFRG (that is, the count is double). This is done in view of the nature of application of the control, but the number of bits of the register CYCRG may be equal to that of the register REFRG. In the configuration of FIG. 1, when the register CYCRG is set to maximum and the register REFRG is set to make the ON period maximum, the duty factor is one half. If the numbers of bits of the registers are equal, the duty factor may be varied up to 100%. If there is one bit difference between the numbers of bits of clock conversion of the register CYCRG which determines the period T and the register REFRG which determines the ON period, the duty factor may be varied by skillful technique upon design of a controller chip such as a 8 bit CPU. Accordingly, in the present embodiment, a variable length of the period of the PWM may be great, but it will go down below the duty factor of ½ (maximum) at a frequency lower than a certain value.

Figure 5:
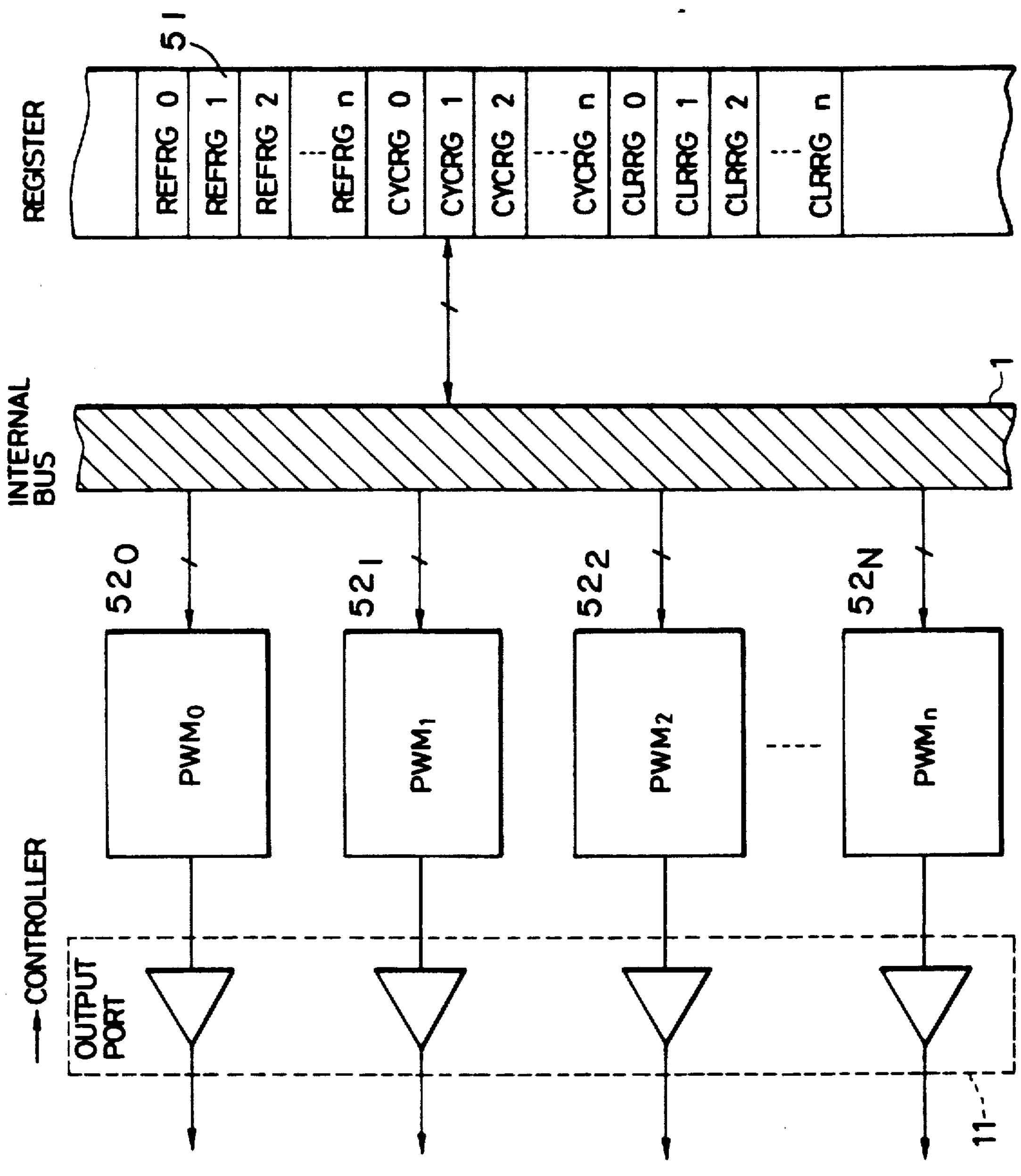
FIG. 5 shows a configuration of program control of the PWM control.

FIG. 5 shows a relation between the registers 51 in the controller 100 and the PWM control signal generator shown in FIG. 1. In FIG. 5, the PWM's may be arranged up to n channels. $PWM_0$-$PWM_n$ ($51_o$-$51_n$) correspond to the circuit shown in FIG. 1 and $11_o$-$11_n$ corresponds to the output ports. The registers may be developed in the RAM 105. When the controller 100 is applied to the power control, precalculated values are set in the registers if the power control is an open loop control, and when certain voltage is required, the content of the register of the corresponding channel is read and it may be set in REFRG, CYCRG and CLKRG. In a closed loop control, the A/D converter 108 monitors the voltage to set REFRG, CYCRG and CLKRG according to the monitored voltage.

Application to a Copying Machine Power Supply

The present embodiment relates to a power supply system which uses the variable PWM control and is used primarily in a copying machine. Many types of electromechanical equipments including the copying machine use various power supplies. For example, most equipment require 5V, ±12V and 24V. In the copying machine, corona discharge high voltages 5.5KV, 6KV, an A.C. voltage 4.5KV and a developing bias sine wave or D.C. voltage of several hundreds volts are additionally required. In the past, such power supplies were separately provided. Thus, even if the power supplies were reduced in size, considerable space is required, which results in high cost.

Each power unit of the power supply of the present embodiment is principally of the switching type. Thus, by using the variable PWM generator, a high precision power supply system which is inexpensive and compact is provided. As an example, a configuration of a power supply system of the copying machine is shown in FIG. 6.

Figure 6:
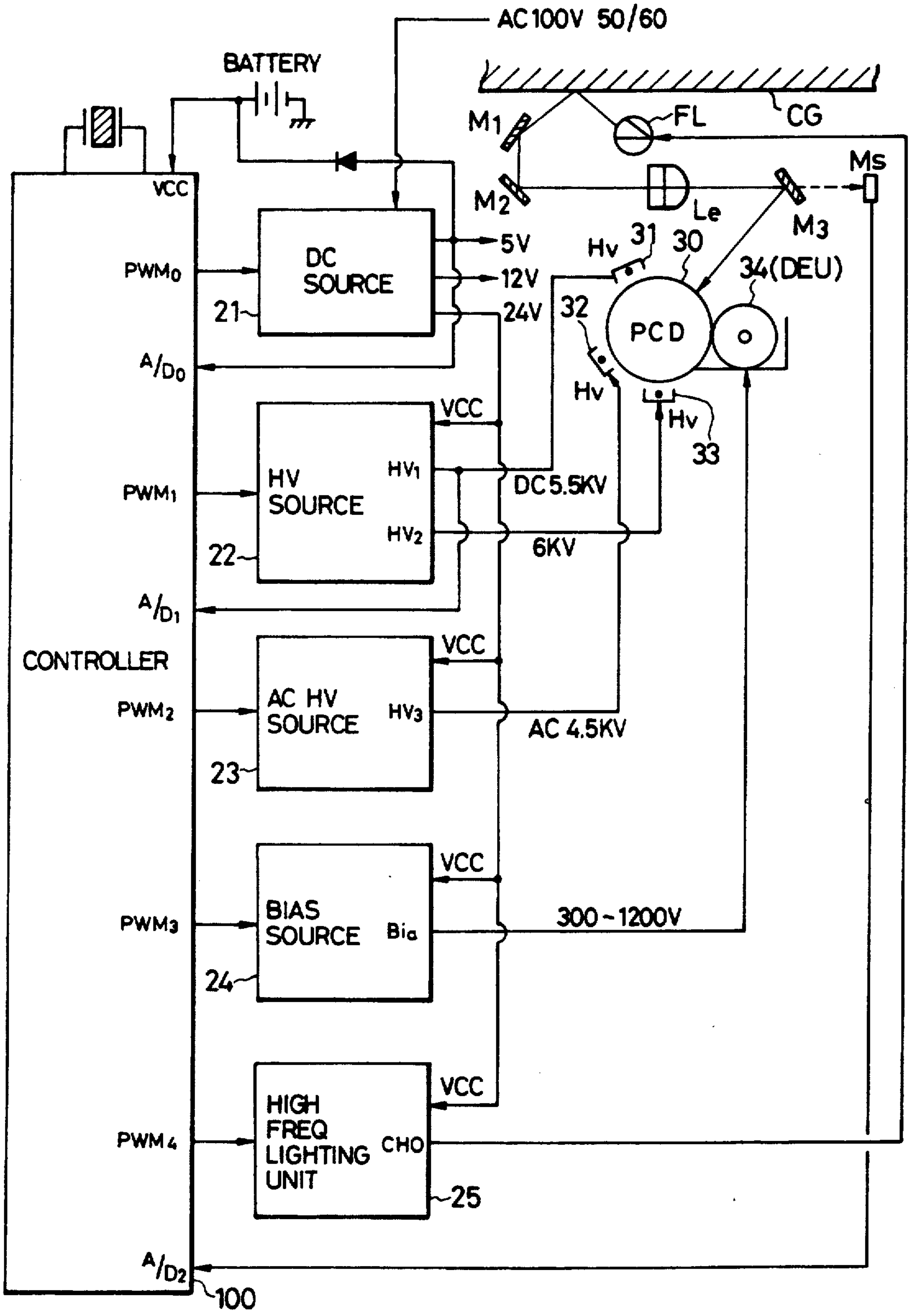
FIG. 6 shows an application to a copying machine.

In FIG. 6, the PWM of the controller uses five channels 0–4 of the controller of FIG. 5. All of them use the variable PWM. The A/D converter to monitor the voltage necessary for the voltage control uses three channels 0–2. It does not match to the number of channels of the PWM because the voltage which does not require precision is controlled in an open loop and the output voltage need not be monitored.

Elements of FIG. 6 are explained. CG denotes a contact glass which is a document table on which a document is mounted. FL denotes a light source which is a fluorescent lamp. $M_1$-$M_3$ denote mirrors which are reflection mirrors for a light axis. The mirror $M_3$ is a half-mirror. A photo-sensor MS detects a brightness of the document. A high frequency firing device for the fluorescent lamp FL keeps a light intensity at a constant level to assure high quality of image. Le denotes a zoom lens which is used to enlarge or reduce an image size. PCD 30 denotes a photoconductor drum. An image reflected by the mirror $M_3$ is focused onto the PCD 30. Hv 31 denotes a charging corona discharger to which a corona discharging voltage of approximately 5.5KV DC is applied from a high voltage supply 22. Hv 33 denotes a corona discharger for transferring toner, to which approximately 6KV is applied from the high voltage supply 22. Hv 32 denotes a discharging corona discharger to which approximately 4.5KV (effective value) A.C. at approximately 1KHz is applied. DEU 34 denotes a development unit which sprays toner onto the photoconductor. A bias voltage of approximately 300V ~ 1.2KV is applied to the cylinder depending on the quality of image. When the photoconductor is fatigued through the use, a residual potential is high even after discharge, and a background (white area) of a copy sheet is made dirty. For example, an electrostatic sensor (not shown) arranged on the PCD 30 measures a potential of a light area (to which light is irradiated and a potential thereat is low) to control the bias potential and the frequency (200Hz ~ 3KHz). The outline of the copy system has thus been described.

In FIG. 6, five power supplies are used. A DC power supply 21 generates 5V, 12V and 24V. The 5V power supply is used for the controller and a display console. In the present embodiment, the controller is backed up by a battery. When the apparatus is not operated and a main (AC) power supply is off, a voltage is supplied by the battery. When the power supply is turned on, the controller is interrupted and the switching by the variable PWM control is activated to generate DC 5V. Thus, the power is supplied from the battery to the DC power supply, which is supplied to the controller. 12V is used as a sensor power supply, DC 24V is used as motor, solenoid, cleaner and DC actuator power supply and a power supply for other power generators. The DC power supply is a switching power supply fed with 100 VAC. The 5V power supply is a power supply for the controller which requires maximum precision. It is fed back to an A/D converter (channel $A/D_0$) so that it is finely controlled. 12V and 24V have no feedback from the output but are controlled with reference to DC 5V. Accordingly, the 12V and 24V power supplies are dependent on the load condition but are dependent on the 5V power supply. This does not cause any practical problem.

Voltage Control

Figure 7:
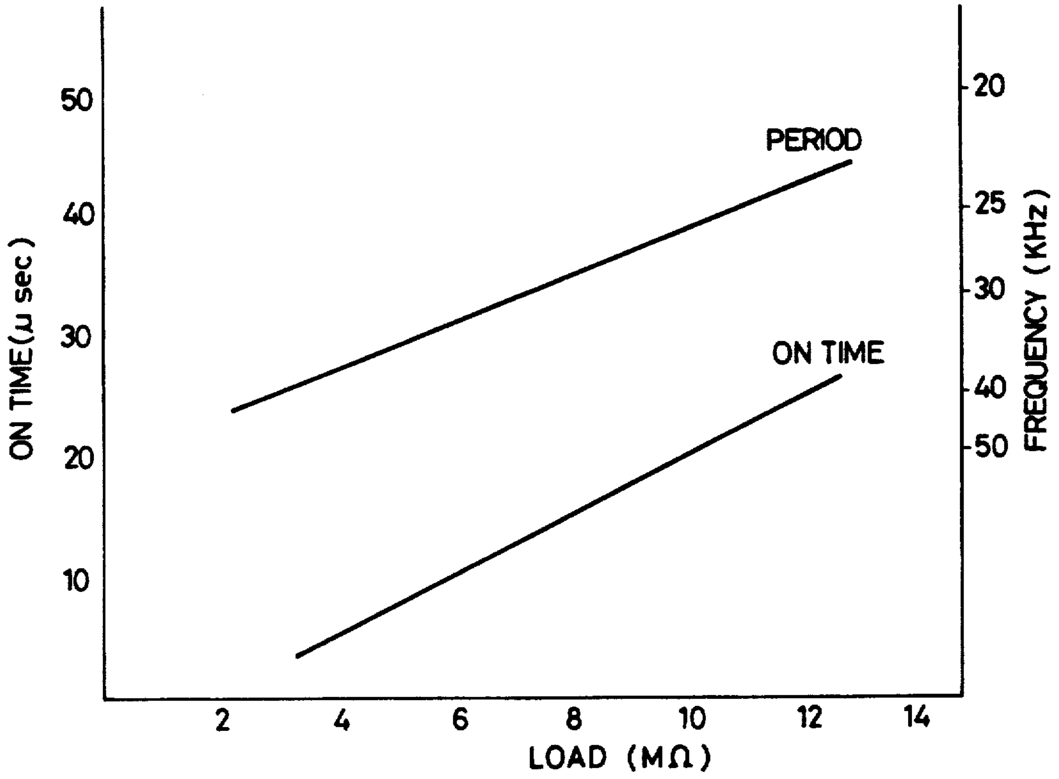
FIG. 7 shows a relation between an ON time and a period in the embodiment.
Figure 8:
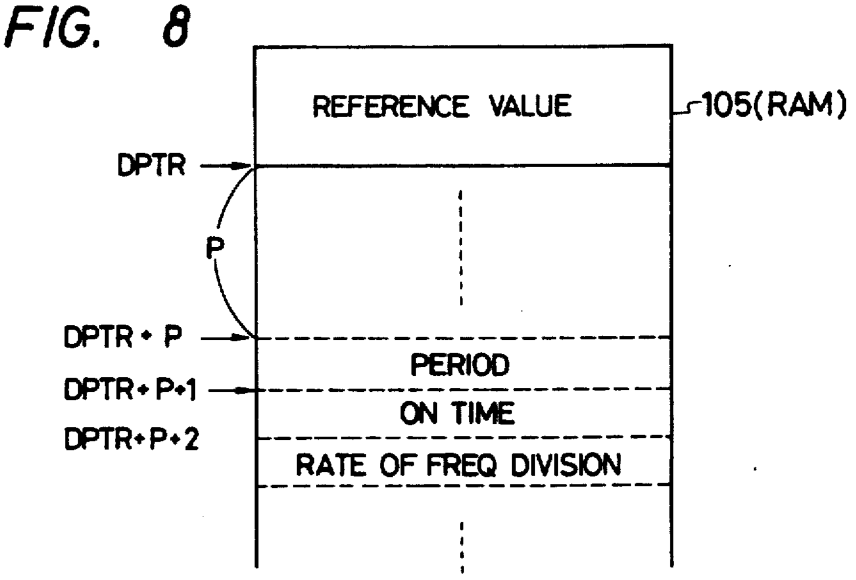
FIG. 8 shows a RAM format of parameters such as period for effecting PWM control.

FIG. 7 shows optimum values of the period T and ON Time for a load change for Hv. For this control, an interrupt controller 115 periodically starts the A/D converter 108 to read the feedback voltage controller 115 reads from the registers the period, ON Time and frequency division rate for the difference between the read voltage and the reference voltage to set them into the REFRG2, CYCRG3 and CLKRG4 so that a closed loop control is effected. FIG. 8 shows a RAM 105 which stores the reference, period and ON Time.

High Precision Voltage Control

High voltage power supply 22, AC high voltage power supply 23, bias voltage power supply 24 and high frequency firing unit 25 are fed from the open loop controlled 24V power supply, which is used as a primary power supply to produce secondary outputs by the PWM control from the controller 100. The 24 VDC power supply is fed by the 100 VAC power supply and generates a secondary voltage 24V by the same PWM control signal as that used for the control of the 5V power supply. Accordingly, there is a fluctuation in the control of the 24V power supply and the feedback involves a delay. As a result, it affects to the succeeding stage power supply fed by 24V.

In order to avoid such affect, a combined time constant T at the output (setting of the register REFRG) is larger in a more preceding stage. In FIG. 6, a combined time constant $T_0$ of the DC 24V power supply is larger than a combined time constant $T_1$ at the output of the high voltage power supply. As a result, a finer PWM control is attained in the succeeding stage of the power supply and the above affect is cancelled. Since the AC high voltage power supply, bias power supply and high frequency firing unit produce AC outputs, the affect is prevented by preparing several combinations of time constant in the input stage.

Effects of the Embodiment

In the embodiment applied to the copying machine, start/stop of the power supply and the generation signal source are carried out in one chip, the cost of the power supply is reduced by combination, the volume is reduced and the control function and precision are improved.

By the one-chip LSI, DC low voltage are generated by using various variable PWM's, and other voltages, high voltage, AC voltage and stabilizing high frequency voltage are generated by the variable PWM's from the LSI. Further, by combination of time constants, provides that a primary voltage change does not make an effect on generation of a voltage of a next stage source. The precision of the low voltage output is maintained by monitoring the output end used for the voltage generating power supply. In this manner, combination of power supplies, unification of generation of control signals, reliability, stability, performance enhancement and cost reduction are attained.

Figure 9:
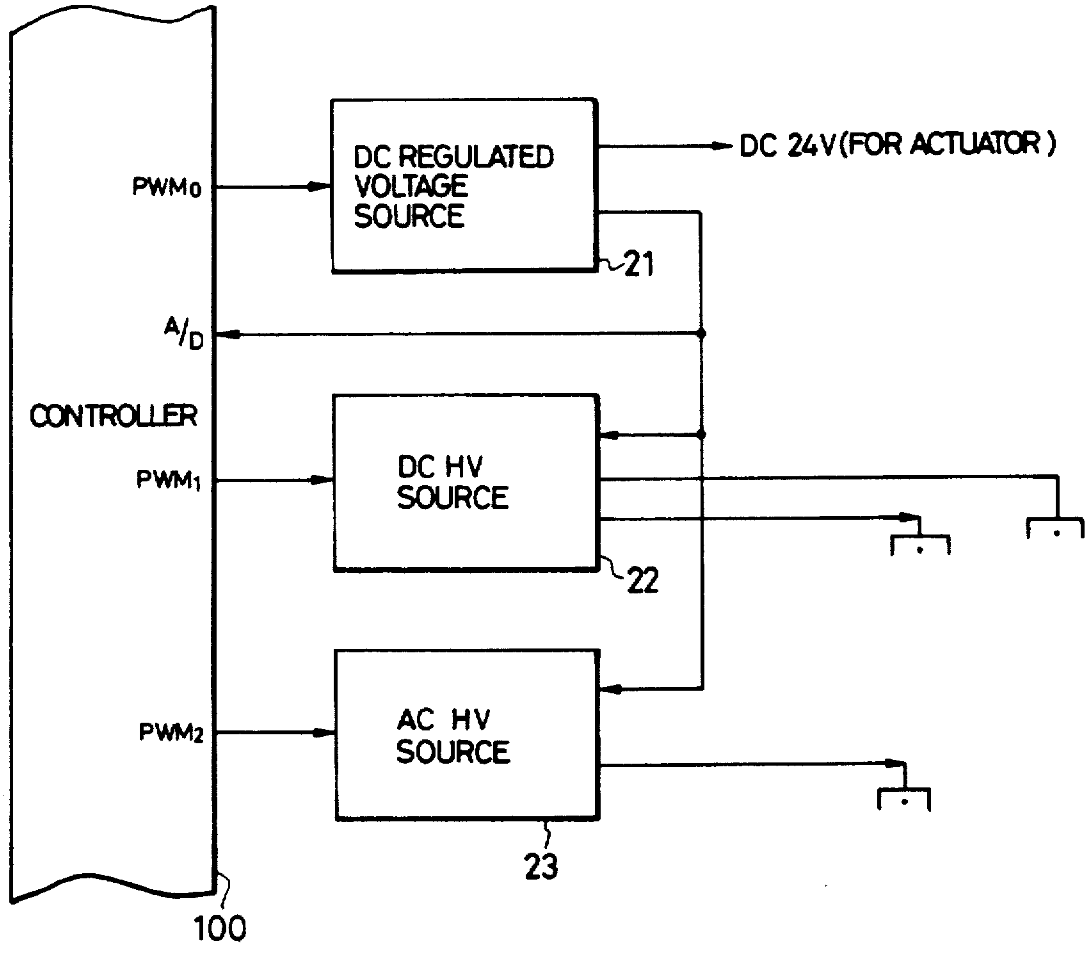
FIG. 9 shows a modification which attains higher precision voltage control.

When a voltage is to be generated by the PWM control by a DC-DC converter while using a stabilized DC power supply generated by the PWM control as a source. it is necessary to compensate by a difference of combined time constants in order to prevent expansion of a secondary control error. When high performance and low cost are to be attained as the LSI technology advances, the controller of the present embodiment is implemented in LSI to generate multi-purpose power supplies. In such a case, the combined time constant may be varied to prevent the secondary effect as is done in the present embodiment, or in a power supply which requires a higher precision, a feedback is applied and the power supply is monitored by the A/D converter to effect the closed loop control. If there is a room in the A/D input port, the voltage generating DC 24V power supply is monitored and parameters for compensating for variable factors of PWM according to change in the load may be prepared by a macro instruction as shown in FIG. 9. Alternatively, a switch for controlling an image quality may be arranged in the console so that the bias voltage or frequency is changed to provide a desired image quality (hard tone or soft tone). This is attained by the variable PWM.

Other PWM Control

Figure 10:
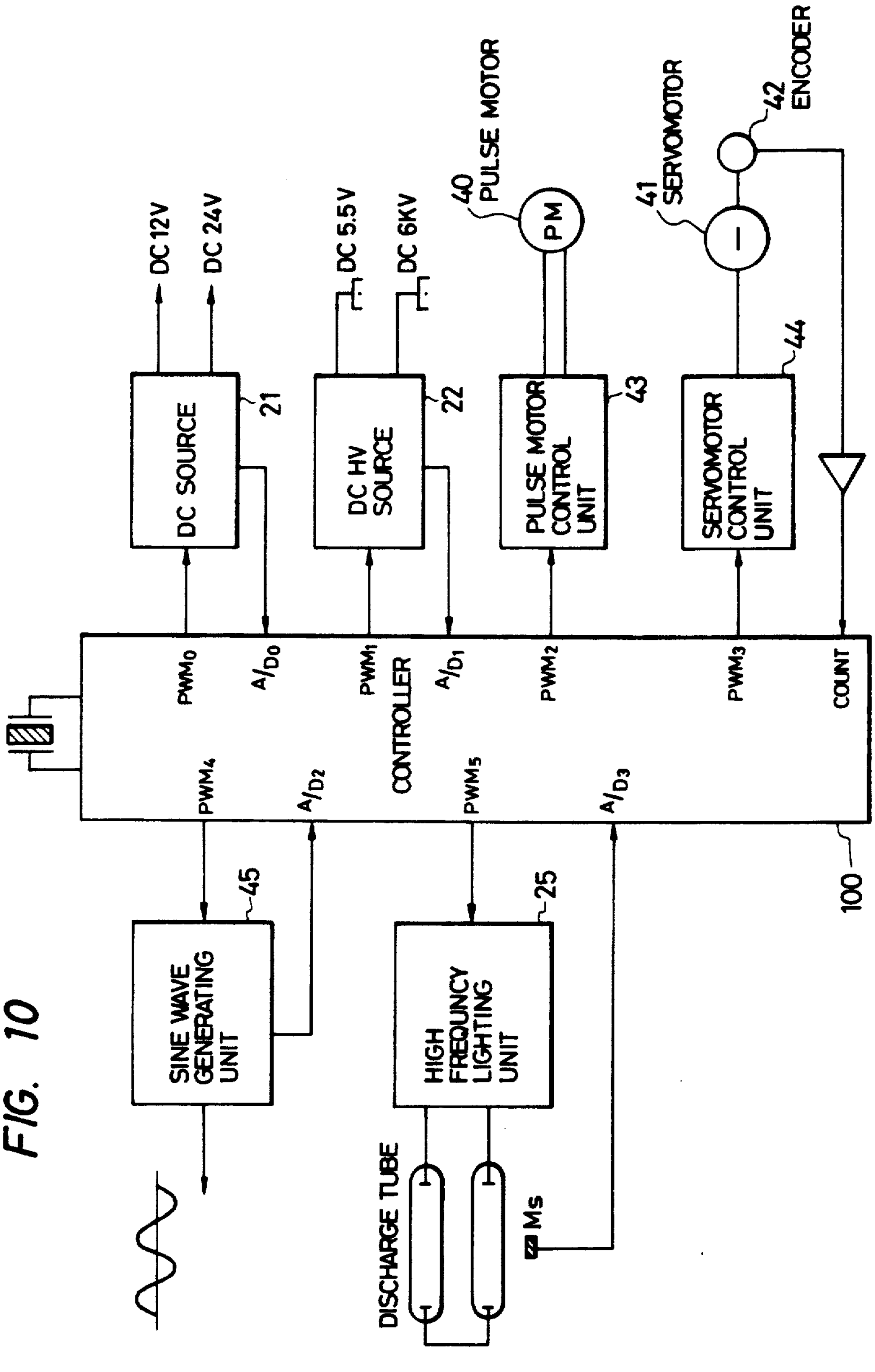
FIG. 10 shows a block diagram of another embodiment.

In an embodiment of FIG. 10, a pulse motor 40 is also PWM-controlled in addition to the embodiment of FIG. 6. For a pulse motor controller 43, a phase conversion (serial to parallel) logic circuit and a driving power device are a servomotor 41, with encoder 42 and a servo motor controller 44 is also PWM-controlled and in addition to a controller 100. A sine wave generator 45 changes its output frequency in accordance with an output frequency of the PWM4 and its output amplitude (effective value) in accordance with a duty factor. Accordingly, the image quality and density can be changed in accordance with user's desire by changing the bias of the developing unit of the copying machine. The sine wave generator 45 corresponds to the AC power supply 23 and the bias power supply 24 of FIG. 6. High frequency lighting unit 25, discharge tube, photo-sensor Ms, DC source 21 and DC HV source 22 correspond to equivalent components of FIG. 6.

The embodiment shown in FIG. 10 uses the A/D converter and event counter as feedback. A change is rapidly picked up and feed back control is performed to aim at a target value. This can be rapidly attained by a macro instruction.

Figure 11A:
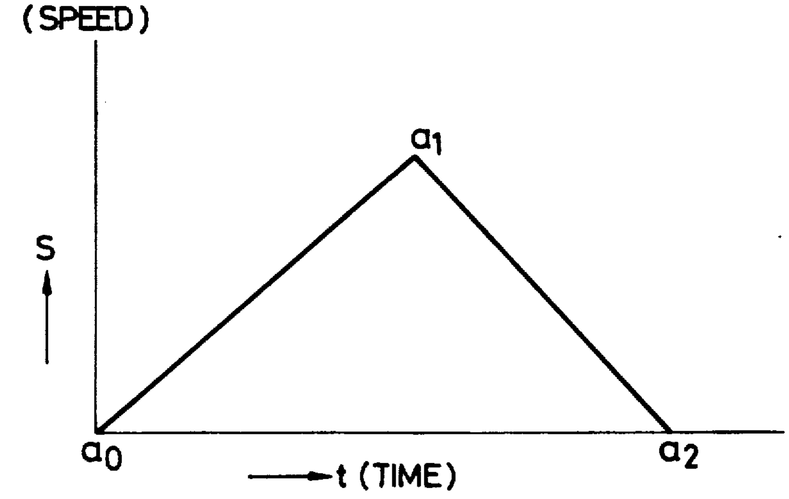
FIG. 11A and 11B illustrate speed control by the PWM control in the other embodiment.
Figure 11B:
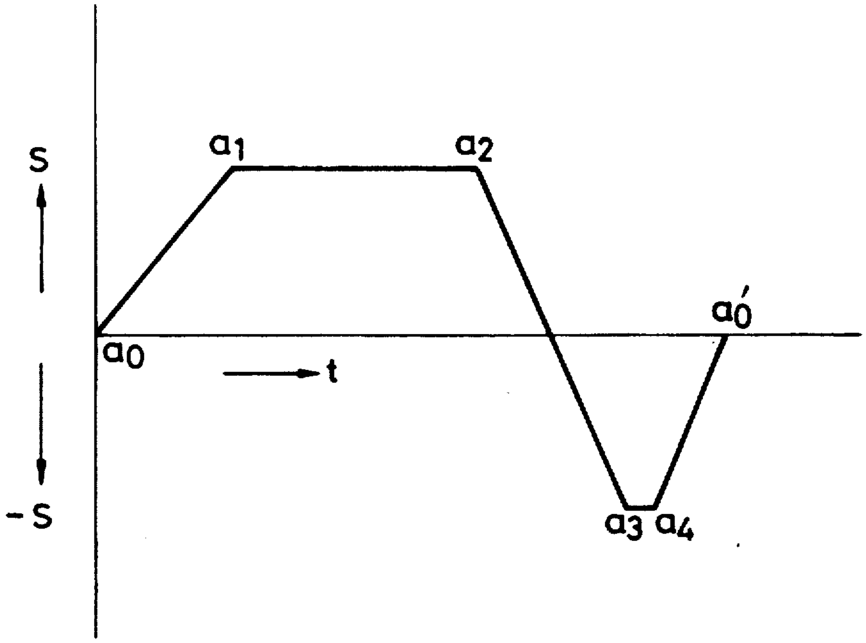

FIGS. 11A and 11B show a time chart in an application of a motor. FIG. 11A shows a time chart of a pulse motor 40. A speed is raised from an initial speed 0 at a point $a_0$ and linearly accelerated until it reaches a point $a_1$. Then, the speed is linearly decelerated and reaches zero at a point $a_2$. In order to attain highly linear control, a wide range of variable PWM is required. The speed of the pulse motor 40 changes with the frequency of the input pulse but the highly linear control of the pulse motor 40 is attained by appropriately combining the CYCRG which sets the period and the register CLKRG which sets the frequency division ratio of the clock.

Thus, the register CYCRG and register CLKRG are set such that a frequency characteristic which is essentially proportional to the speed characteristic of FIG.

11A is attained, because it may be difficult to attain the wide range of control by setting only the CYCRG3.

FIG. 11B shows an example of speed control of a servo motor 41. The speed is accelerated between points $a_0$ and $a_1$, kept constant between points $a_1$ and $a_2$, reversely rotated between points $a_2$ and $a_3$, kept constant between $a_3$ and $a_4$ and rapidly forwardly rotated between $a_4$ and $a'_0$. The register REFRG for determining the ON period is set to effect the speed control, and the combined control of the register CYCRG and CLKRG is effected to improve the response characteristic.

Figure 12:
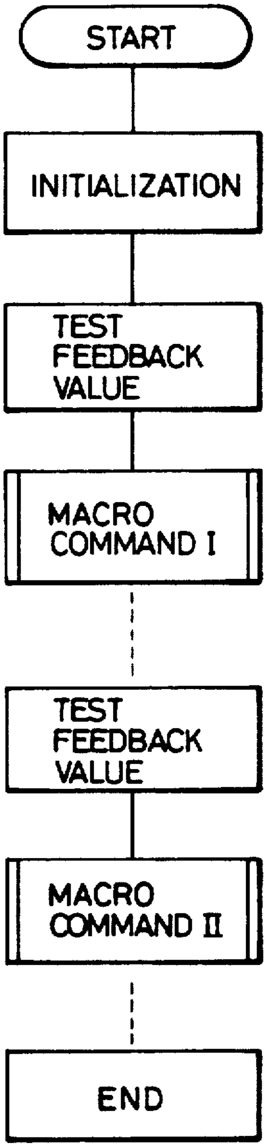
FIG. 12 shows a control flow chart therefor.

FIG. 12 shows a simple flow of the present system which uses a macro instruction. In FIG. 12, macro instruction is fetched and executed by referencing the feedback value (pulse from A/D conversion and encoder 42). Several macro instruction may be prepared. For example, a macro I is used for $a_0$ and $a_1$ in FIG. 11A, a macro II is used for $a_1$-$a_2$ and several macro instructions but high tan $\theta$ and low tan $\theta$ may be prepared for the pulse motors 40. High acceleration or deceleration, or smooth change of the speed may be attained by using the parameters of the registers.

Figure 13:
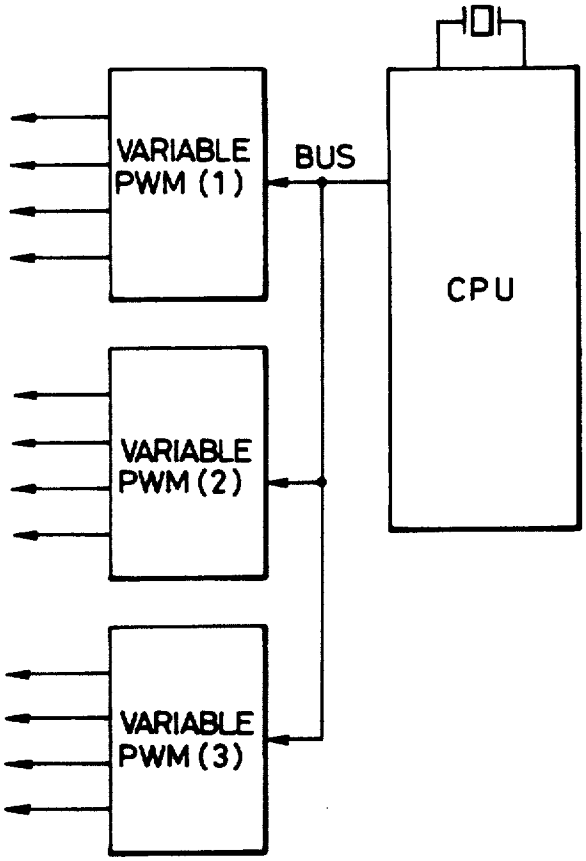
FIG. 13 shows a configuration of a modification.

FIG. 13 shows a modification of the above embodiment in which the PWM control circuit is mounted in a separate IC chip from the CPU 101. It is effective when a number of channels are required.

Effect of the Embodiment

In the present embodiment, the macro instruction by microprogram which controls the ON time, period and clock frequency division ratio as parameters is provided so that the variable PWM is effected precisely over the wide range. Thus, the present embodiment is applicable to various electromechanical applications.

Comparison with Prior Art

Figure 14:
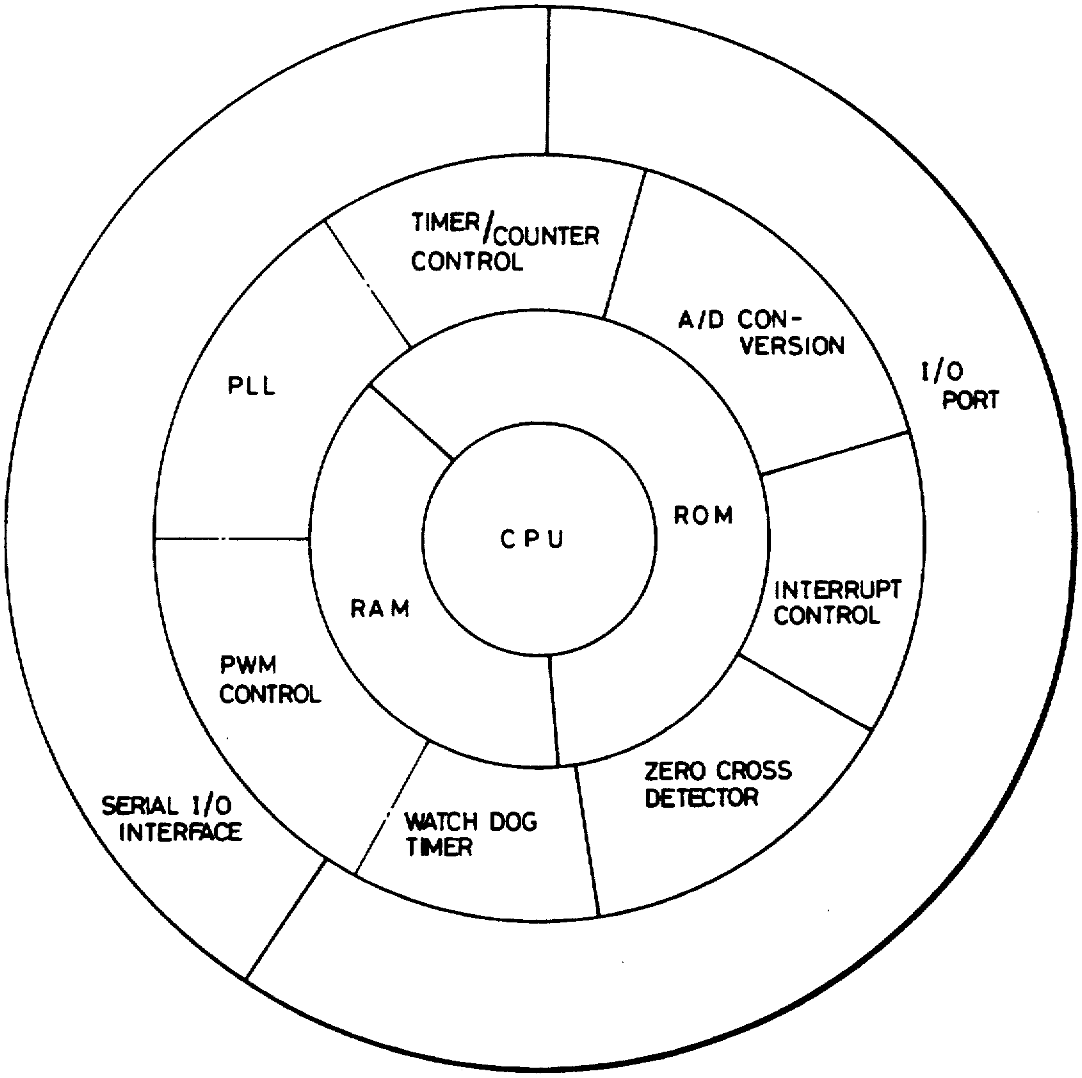
FIG. 14 PRIOR ART
FIG. 14 shows a prior art hierarchy.

FIG. 14 shows a layer of a prior art one-chip controller relatively recently announced. With the elements shown therein, control to the ordinal electromechanical is effected but the following problems are included. ① When more process tasks are given and more rapid access is required, a single controller cannot handle it. The prior art controller is highly dependent on the host computer and there are too many restrictions to allow independent operation of the I/O controls (A/D conversion, PLL, PWM, etc.).

On the other hand, since the controller 100 of the present embodiment has its own control and systematic control, the dependency to the host computer is minimal.

② Counters are frequently used to generate PWM and one-shot pulses. When they are simultaneously operated, the use of the timer/counter control of FIG. 14 is restricted. As the A/D conversion is used, the CPU is frequently interrupted and the execution of other tasks is impeded. In the prior art, a plurality of one-chip controllers have been used. However, where the plurality of controllers are used, a software of protocol of information exchange among the controllers is complex and the burden to the software is high. As the nature of the electromechanical control, the counter/timers are used in many applications.

For example, a solenoid is intermittently operated for a certain period in a certain sequence cycle, a motor is rotated for a certain period and a clutch is actuated so that various actuators are parallelly operated. In such a case, the timer is operated in multi-channel to meet the requirement. The timing control is essential to the sequential operation. To this end, pulses are applied externally (of the controller) and counted by the counter to proceed the counting. The timing pulse for the sequence is not one but two or more depending on the application. Since the electromechanical control accompanies with movement, a plurality of motors are controlled simultaneously in many cases. In such cases, the encoder pulses from the motors are supplied to the controller as position information and the controller counts them to control the position. Accordingly, the timer/counters are parallelly used in many cases.

In the construction shown in FIG. 14, since the times are used to generate PWM and PLL reference pulses for the servo motor, the number of channels available to the timer/counters is necessarily small.

In the controller of the present embodiment, the load to the timer/counters is relatively low because of the independency of the PWM control.

As described above, the electronic control apparatus of the present invention controls the input/output devices to be controlled, precisely, systematically and with expandability.

The present invention is not limited to the illustrated embodiments but various modifications may be made.

We claim:

1. A controller for an image apparatus comprising at least one electrical load, said controller comprising:
   - memory means for storing plural parameters, the parameters including a first parameter for a period and a second parameter for a duty factor;
   - generating means for repeatedly generating a pulse control signal for controlling the load in accordance with the parameters, said generating means comprising means for determining a period of the pulse control signal in accordance with the first parameter, and means for determining a duty factor of the pulse control signal in accordance with the second parameter; and
   - reading and setting means for reading the parameters from said memory means and setting the parameters into said generating means,
   - wherein said generating means repeatedly generates the pulse control signal having a predetermined pulse width corresponding to the second parameter at a period corresponding to the first parameter.

2. A controller according to claim 1, wherein the parameters include a third parameter for a frequency division ratio of the pulse control signal.

3. A controller according to claim 2, further comprising a reference clock for generating a clock signal, wherein said generating means determines the period and the pulse width by counting the clock signal.

4. A controller according to claim 3 wherein the parameters include a third parameter for a frequency division ratio, and wherein said generating means comprises means is provided for frequency-dividing the clock signal in accordance with the third parameter.

5. A controller according to claim 1 further comprising input means for inputting analog data from an object to be controlled in processing an image, and conversion means for converting the analog data to digital data, wherein said reading and setting means sets a parameter corresponding to the digital data converted by said conversion means into said generating means.

6. A controller according to claim 5 wherein said conversion means comprises a register for storing the digital data, and said reading and setting means reads the digital data from said register at a predetermined timing and sets a parameter corresponding to the digital data into said generating means.

7. A controller according to claim 5 wherein said conversion means produces a conversion ending signal to said reading and setting means upon completion of converting the analog data to the digital data, and said reading and setting means receives the digital data from said conversion means in response to the conversion ending signal.

8. A controller according to claim 1 further comprising a plurality of generation means for generating a plurality of pulse control signals for controlling plural respective loads.

9. A controller for controlling a plurality of devices of an image processing apparatus, said controller comprising:

a first memory for storing a program for an image processing sequence;

a second memory for storing image processing data;

an output for outputting a control signal for controlling one of the plurality of devices in processing an image;

control means for controlling data processing for the image processing sequence and for controlling said output of the control signal in accordance with the program stored in said first memory; and pulse control means for generating a pulse control signal in accordance with plural parameters set by said control means to control the device so as to be controlled by the pulse control signal, wherein said pulse control means generates the pulse control signal independently from said control means, wherein said first memory, said second memory, said output, said control means and said pulse control means are arranged on one chip, and said pulse control means repeatedly generates the pulse control signal having a predetermined period in accordance with the plural parameters.

10. A controller according to claim 9 wherein the plural parameters are stored in said second memory.

11. A controller according to claim 9 wherein the plural parameters are selected from the group consisting of period, duty factor and frequency division ratio of the pulse control signal.

12. A controller according to claim 11 further comprising a reference clock for generating a clock signal, wherein said pulse control means comprises period determining means for determining the period of the pulse control signal, duty factor determining means for determining the duty factor of the pulse control signal and frequency division means for frequency-dividing the clock signal, and said parameters are set in said period determining means, said duty factor determining means and said frequency division means.

13. A controller according to claim 9 further comprising an input port for inputting analog data from the device to be controlled and means for converting the analog data to digital data, wherein said control means reads one of the plural parameters corresponding to the digital data and sets that parameter into said pulse control means.

14. A controller for an image processing apparatus comprising at least one electrical load, said controller comprising:

means for generating a pulse control signal for controlling the load;

means for setting plural parameters in said generating means, wherein said setting means sets a first parameter for a period and a second parameter for a duty factor in said generating means, and wherein said generating means comprises means for determining a period of the pulse control signal in response to the first parameter and means for determining a duty factor of the pulse control signal in response to the second parameter and said generating means repeatedly generates the pulse control signal having a pulse width corresponding to the second parameter at a period corresponding to the first parameter.

15. A control according to claim 14 further comprising a reference clock for generating a clock signal, wherein said generating means further comprises means for frequency-dividing the clock signal, and said setting means sets a third parameter for a frequency division ratio in said generating means, and wherein said generating means counts the frequency-divided clock signal to determine the period.

* * * * *

UNITED STATES PATENT AND TRADEMARK OFFICE
CERTIFICATE OF CORRECTION

PATENT NO. : 5,146,601

DATED : September 8, 1992

INVENTOR(S) : MASAO HOSAKA, ET AL.

It is certified that error appears in the above-identified patent and that said Letters Patent is hereby corrected as shown below:

ON THE TITLE PAGE:

Under U.S. PATENT DOCUMENTS, "Buschman et al." should read --Buschmann et al.-- (all occurrences).

COLUMN 3

Line 39, "emergent" should read --emergency--.

COLUMN 5

Line 19, "T=(2 CYCRG+1)·CLK" should read --T=(2·CYCRG+1)·CLK--.

COLUMN 10

Line 57, "is provided" should be deleted.

COLUMN 12

Line 38, "control" should read --controller--.

Signed and Sealed this

Second Day of November, 1993

Attest:

BRUCE LEHMAN

Attesting Officer

Commissioner of Patents and Trademarks